March 11, 1958     G. L. BROWN ET AL     2,826,062
APPARATUS FOR INDICATING THE PLASTIC DEFORMATION OF MATERIALS
Filed Sept. 27, 1954     2 Sheets-Sheet 1
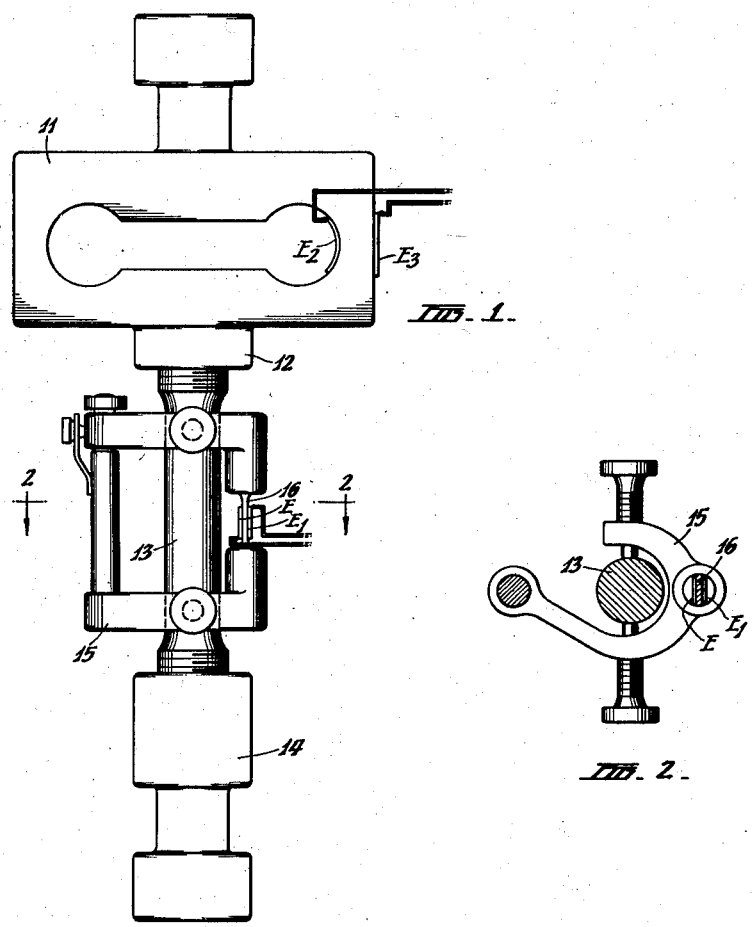
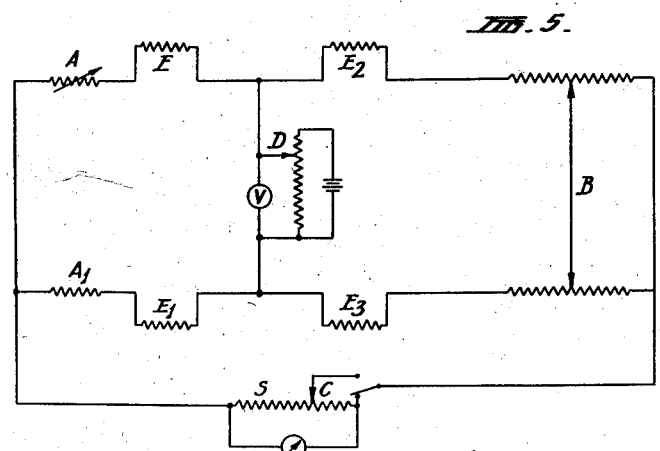
Inventor
Guy Lawrence Brown
Robert Peebles McMurrich
by Pierce, Scheffler + Parker
Attys

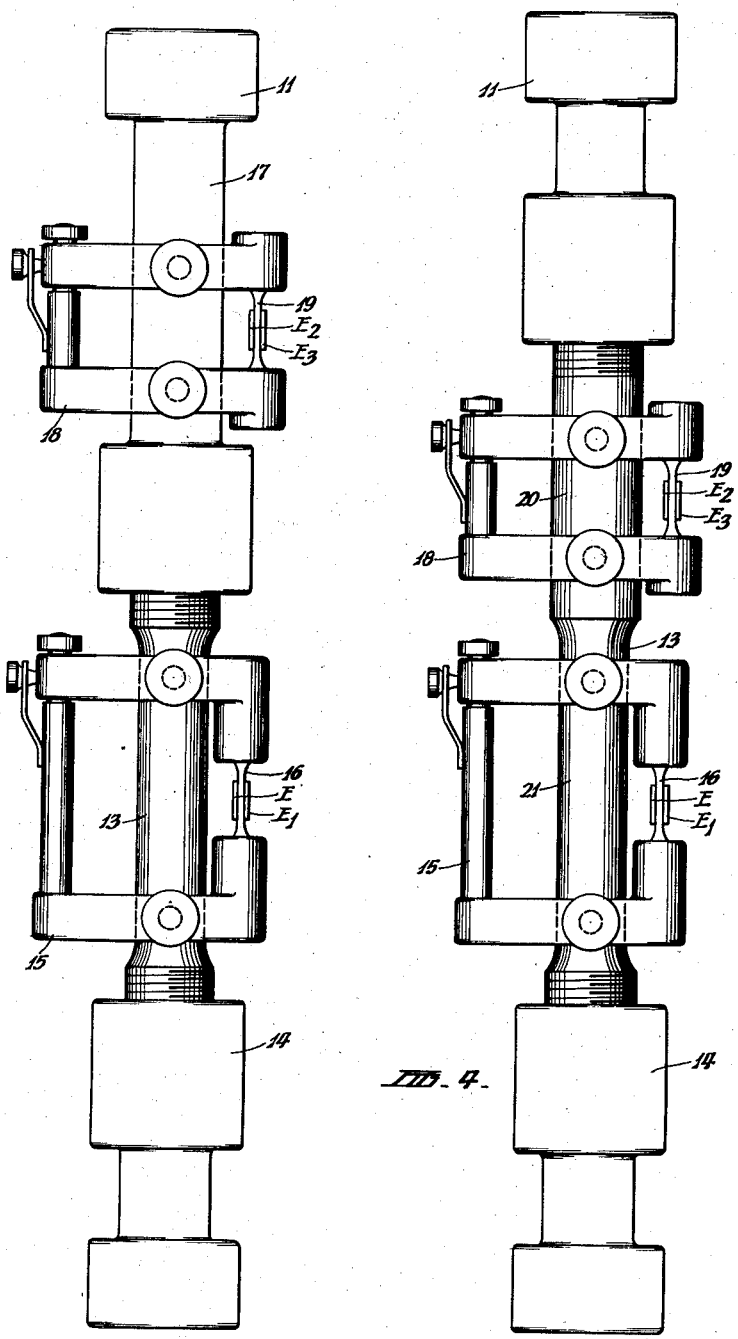

United States Patent Office 2,826,062
Patented Mar. 11, 1958

2,826,062

APPARATUS FOR INDICATING THE PLASTIC DEFORMATION OF MATERIALS

Guy Lawrence Brown, Griffith, and Robert Peebles McMurrich, Elsternwick, Victoria, Australia, assignors to Commonwealth of Australia, Crown Solicitor's Office, Canberra, Australian Capital Territory, Australia Application September 27, 1954, Serial No. 458,638

Claims priority, application Australia October 6, 1953

7 Claims. (Cl. 73—95)

This invention relates to an apparatus for indicating the plastic deformation of materials and refers especially, but is not limited to means for indicating the proof load on a specimen of material, that is, the load at which the plastic deformation of a test length of the specimen equals a required proportion of that test length. The invention is applicable to metallic materials and to certain other materials having a substantial range of elastic deformation.

An important property of materials, especially metallic materials, is the stress at which plastic deformation becomes significant. This property can sometimes be defined as the yield point but in many cases no definite yield point is exhibited. In these cases it is common to define the required property as the certain percentage proof stress, i. e. the stress at which the deformation of the material under load exceeds the deformation which would have occurred if the material had remained elastic by the stated percentage of the length over which the deformation is measured.

The proof stress is usually determined from a tensile test on a specimen of the material by measuring the extension over a gauge length on the test piece under increasing tensile loads and plotting results as the load extension curve. A line is then drawn parallel to the straight, proportional extension portion of this curve but displaced from it by an amount which represents an extension equal to the required proportion of the gauge length, which may be 0.1 or 0.2%. The proof load is then obtained as the load corresponding to the intersection of this line and the load extension curve; the proof stress being calculated from the proof load and the cross-sectional area of the test specimen.

This procedure involves a considerable amount of work, but the labour can be somewhat reduced by producing the required load extension curve with the aid of one of the various types of high magnification autographic recorders available. These instruments, however, are costly and in any case it is still necessary to construct the off-set line parallel to the proportional extension portion of the curve and read off the load corresponding to the intersection of this line and the curve. In most cases the load extension curve is required only as the means of determining the proof load and therefore is not necessary if the proof load can be found accurately by other means.

It is the object of this invention to provide relatively inexpensive means for indicating substantially immediately the extent of plastic deformation of a specimen of material under load and especially for determining its proof load whereby the disadvantages of existing methods and apparatus used for this purpose are largely obviated.

Apparatus for indicating the extent of plastic deformation, and particularly the proof load, of a material, may comprise, according to the invention, means for applying a load to a test length of the material, means whereby an equal or proportional load is applied to an elastic member, electric resistance strain gauges connected to the test length and to the elastic member, the strain gauges being connected in a bridge circuit or the like, and means in or associated with said circuit for indicating the extent of plastic deformation of the test length.

The elastic member may form part of, or may be separate from, the material of which the test length is a part, and if separate from said material, may be connected thereto. The elastic member is of such dimensions or other properties that the stress therein does not exceed the elastic limit during the time that the device is in operation.

The bridge circuit preferably includes means for varying the response (that is, the effect of a change in resistance) of one of the gauges or sets of gauges; means for balancing the bridge; means for indicating the extent of any unbalance of the bridge; and a source of electric current at constant potential.

By manipulation of the response and balancing adjustments, mentioned above, the bridge may be balanced and caused to remain balanced without further adjustment while load is applied to the specimen, irrespective of the cross-sectional area or modulus of elasticity of the specimen; provided only that the deformation of the test length of the specimen remains elastic. Subsequent plastic deformation of the test length of the specimen, however, unbalances the bridge and the extent of the plastic deformation alone may be shown by the unbalance indicator in the bridge circuit. A direct reading of deformation may be obtained by previous calibration of the indicator.

The apparatus of this invention therefore provides:

(i) An immediate indication of the extent of plastic deformation occurring in a test specimen during application of load to the specimen.

(ii) Means for substantially eliminating the effect of elastic deformation occurring in a test specimen during application of load to the specimen, in determining the extent of plastic deformation.

(iii) Means for substantially eliminating the effects of differences between specimens, in cross-sectional area and/or modulus of elasticity, in determining the extent of plastic deformation occurring in each specimen during application of load to that specimen.

(iv) An immediate indication, in conjunction with known methods of load measurement, of the load under which a test length of a specimen deforms plastically to an extent equal to any particular proportion of that test length.

In the following description of particular forms of the invention reference is made to the accompanying drawings in which:

Figure 1 is a side view of apparatus according to the invention,

Figure 2 is a view in section on line 2—2 of Figure 1,

Figures 3 and 4 are views similar to Figure 1 of modified apparatus according to the invention, and Figure 5 is a circuit diagram showing suitable electrical connections for the apparatus in Figures 1 to 4.

In the drawings the same reference characters refer to like or corresponding apparatus.

Referring firstly to Figures 1 and 2 of the drawings, these figures illustrate testing apparatus comprising a loading shackle 11 of known type, constructed for connection to the load applying means of a tensile testing machine (not shown). The shackle 11 has an internally threaded boss 12 adapted to receive one end of a test piece 13 of the material to be tested. The other end of the test piece is screwed into another shackle 14. An extensometer 15 is mounted on the test piece 13 and includes a strap 16 which is flexed, during loading. Strain gauges E and $E_1$ are attached to the strap 16, and other strain gauges $E_2$ and $E_3$ are attached to one side of the loading shackle 11.

The arrangement is such that on the application of load, the side of the strap 16 to which the strain gauge E is attached is under tension, while the side to which $E_1$ is attached is under compression, and similarly the surface to which the strain gauge $E_2$ is attached is under tension while the surface to which the strain gauge $E_3$ is attached is under compression.

The strain gauges E, $E_1$, $E_2$ and $E_3$ are connected in a bridge circuit and there is provided in the circuit a galvanometer or out-of-balance indicator, means (such as a variable resistor) for varying the response of one of the sets of gauges, and a battery or other source of current at constant potential.

The loading shackle 11 is of such dimensions that the maximum stress therein is below its proportional limit under the maximum load applied to the test piece, and the strain gauge response with increasing load is therefore linear. The extensometer carries a negligible fraction of the load and the response of the strain gauges thereon is therefore proportional to the extension of the test piece. The bridge resistances are adjusted according to the cross-sectional area and modulus of elasticity of the test piece, so that the balance is unchanged by increasing load as long as the extension of the test piece is proportional to the load. Any departure from proportionality is then indicated by deflection of the galvanometer. The galvanometer scale may be graduated in percentage of the extensometer gauge length, or a constant galvanometer deflection for various percentage extensions may be obtained by means of a shunt.

A suitable relay may be incorporated to give visible or audible indication when a required percentage extension is reached. Such relay, if required, may comprise an electronic device triggered by the unbalance current in the indicator circuit or, if a mirror galvanometer is employed, a photo-electric cell may be suitably arranged for operation by the movement of the light spot from the galvanometer. A buzzer and/or a signal light on the testing machine dial may be operated by such means.

Figure 3 of the drawings shows a modified arrangement according to the invention wherein the loading shackle 11 has an extended stem 17 and a second extensometer 18 is mounted in the stem 17. In this case the strain gauges $E_2$ and $E_3$ are attached to the highly stressed strap 19 of the extensometer 18.

Instead of employing one of the loading shackles as the elastic member, another separate member may be used, or the elastic member may comprise an enlarged part of the specimen being tested, the said member or part being of such material and cross-sectional area that it is not deformed beyond its elastic limit during operation of the apparatus. Figure 4 shows such an arrangement wherein the test piece 13 is elongated to provide a section 20 of uniform cross-section to which the second extensometer 18 is fitted. The cross-sectional area of the section 20 is sufficiently greater than that of the normal test section 21 to ensure that the section 20 is not deformed beyond its elastic limit during application of the greatest test load on the specimen.

Figure 5 of the drawings shows one form of circuit diagram which may be used in carrying out the invention. In this figure, A and $A_1$ are balancing resistances, A being variable, B is a resistance adjustment, D is a supply voltage regulator, V is a voltmeter, G is a galvanometer, S is a shunt, and C is a shunt adjustment. E and $E_1$ are the extensometer strain gauges connected to the test piece, and $E_2$ and $E_3$ are the strain gauges connected to the elastic member.

In operation, the voltage is adjusted to a predetermined constant value by the adjustment D, and the bridge is balanced by the variable resistor A.

Load is applied slowly to the test piece and B is adjusted until the galvanometer spot remains constant with increasing load. The circuit is then re-balanced if necessary, by re-adjusting variable resistance A. During this operation the load should preferably not exceed about half the value equivalent to the anticipated limit of proportionality of the test piece.

The load is steadily increased and deflection of the galvanometer occurs when the elastic limit of the test piece is exceeded and plastic deformation takes place. The load reading on the testing machine is noted when the galvanometer deflection reaches a pre-determined value, corresponding to the percentage extension required, which value is regulable by the shunt adjustment C.

The particular form of the resistance adjustment B illustrated, comprising two resistances in adjacent arms of the bridge and an adjustable shorting connection is advantageous in that adjustment thereof does not affect the sensitivity of the galvanometer.

We claim:

1. Apparatus for indicating the extent of plastic deformation, and particularly the proof load, of a material, comprising means for applying a progressively increasing load to a test length of the material, means whereby an equal or proportional load is applied to an elastic member, electric strain gauges connected to the test length and to the elastic member, the strain gauges being connected in a bridge circuit or the like, said bridge circuit including means for maintaining the same in balance only so long as said load is below that which stresses said test length to its elastic limit, and means connected with said bridge circuit and responsive to the amount of the unbalance of the bridge established after said test length passes its elastic limit for indicating an extent of plastic deformation of said test length corresponding to a predetermined percentage of its initial length.

2. Apparatus according to claim 1 wherein the strain gauges connected or connectible to the test piece are incorporated in a strain gauge extensometer.

3. Apparatus according to claim 1 including a loading shackle which constitutes the said elastic member, and characterised in that the strain gauges associated with said elastic member are applied directly thereto.

4. Apparatus according to claim 1 wherein the strain gauges associated with said elastic member are incorporated in a second strain gauge extensometer.

5. Apparatus as defined in claim 1 wherein a pair of strain gauges are connected to said test length such that the electrical effects of the two are of opposite sense as said load is applied, and a pair of strain gauges are connected to said elastic member such that the electrical effects of the two are of opposite sense as said load is applied, and wherein said bridge circuit includes balancing resistors in circuit with each of the strain gauges connected to said test length.

6. Apparatus as defined in claim 5 and which further includes means in said bridge circuit for varying the response of one of said gauges.

7. Apparatus as defined in claim 6 wherein the means for varying the response of one of said gauges comprises resistances in adjacent arms of the bridge and an adjustable shorting connection for said resistances.

References Cited in the file of this patent

UNITED STATES PATENTS

| | | |
|---|---|---|
| 2,356,763 | Keinath | Aug. 29, 1944 |
| 2,612,774 | Zener et al. | Oct. 7, 1952 |
| 2,651,196 | Pinkel | Sept. 8, 1953 |
| 2,677,271 | Faris et al. | May 4, 1954 |

FOREIGN PATENTS

| | | |
|---|---|---|
| 1,022,513 | France | Dec. 17, 1952 |